July 20, 1943.  J. E. SCOTT  2,324,600
ELECTRIC LIGHTING MEANS AND CONTROL THEREFOR
Filed Dec. 21, 1940  2 Sheets-Sheet 1
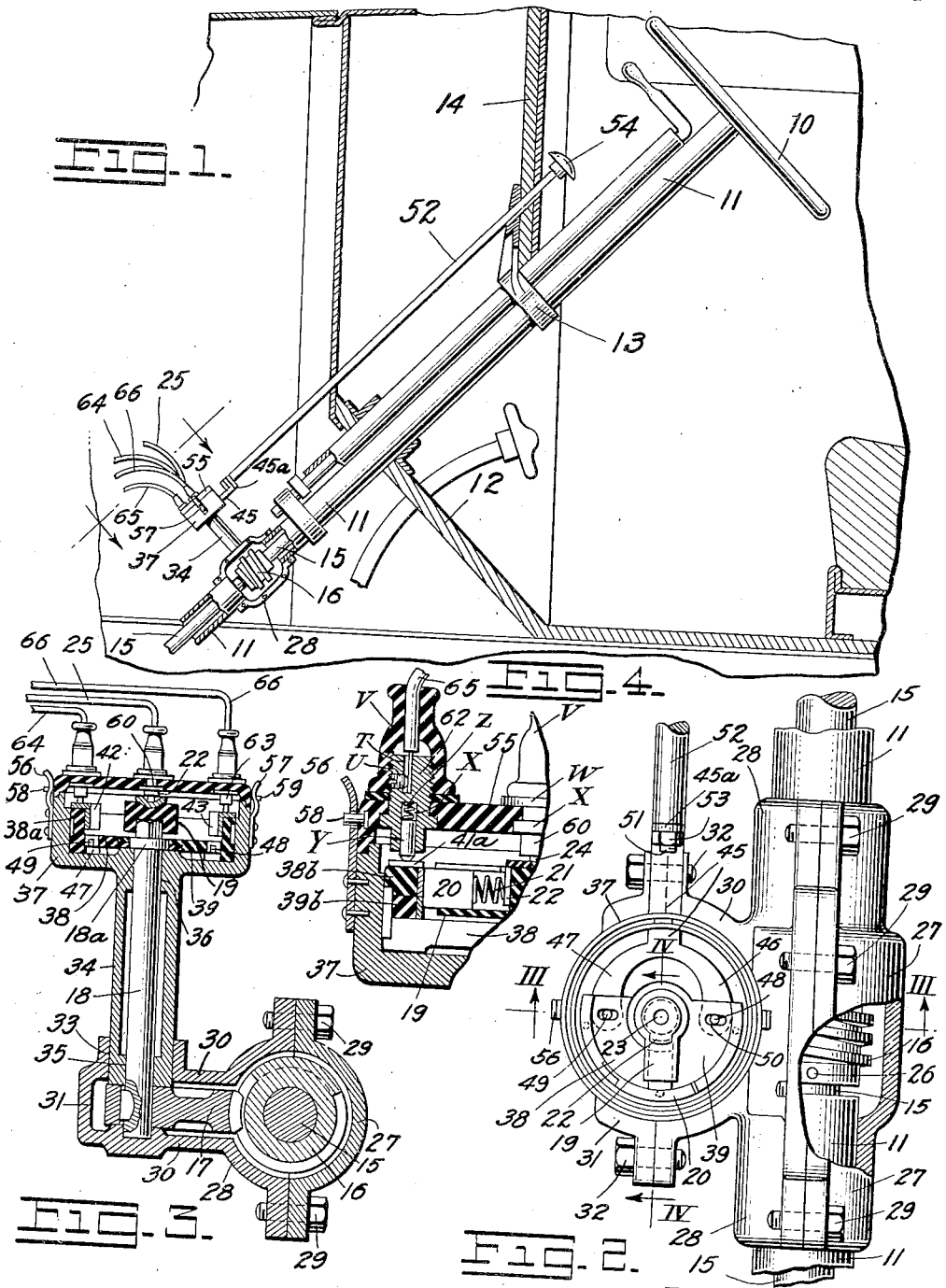
Inventor:
Joseph Earl Scott
By M. Y. Charles
Attorney.

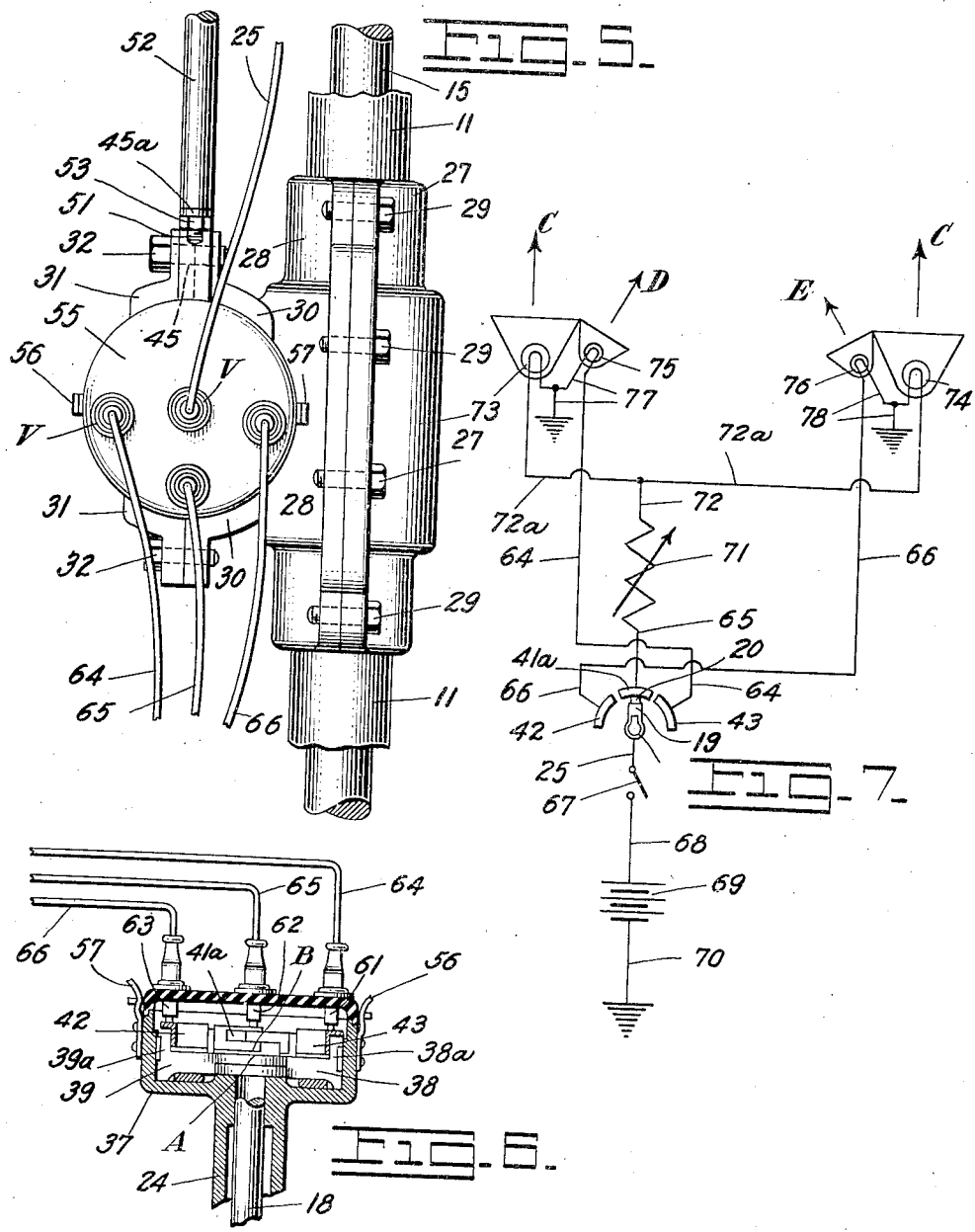

Patented July 20, 1943

2,324,600

UNITED STATES PATENT OFFICE 2,324,600

ELECTRIC LIGHTING MEANS AND CONTROL THEREFOR

Joseph Earl Scott, Pratt, Kans.

Application December 21, 1940, Serial No. 371,217

2 Claims. (Cl. 200—59)

My invention relates to an improvement in vehicle angle lights and operating means therefor. The object of my invention is to provide a means whereby head lights on vehicles may be controlled to burn until the vehicle is guided to make a right or left turn, at which time the head lights will be extinguished and an angle light that is directed in the direction of the turn being made will be lighted.

A further object is to provide a light control device of the kind mentioned that may be easily and quickly adjusted to light or extinguish the light at any desired degree of the turn being made by the vehicle.

A still further object of my invention is to provide a device of the kind mentioned that is easy and inexpensive to make; one that is applicable to all vehicles having a steering apparatus; and one that is simple to use; and one that is substantial and long lived. These and other objects will be more fully explained as this description progresses.

Now referring to the accompanying drawings;

Fig. 1 is a side view of the switch control device as it is applied to the steering apparatus of an automobile, parts being removed and shown in section for convenience of illustration.

Fig. 2 is an enlarged detail plan view of the switch and operating means therefor, the brush cap being removed, and parts being broken away for convenience of illustration. The view is taken along the line II—II in Fig. 1 and looking in the direction of the arrows.

Fig. 3 is a detail cross sectional view through the switch and operating device therefor, the view being taken along the line III—III in Fig. 2 and looking in the direction of the arrows.

Fig. 4 is an enlarged detail sectional view through the switch and brush assembly, the view being taken along the line IV—IV in Fig. 2, and looking in the direction of the arrows.

Fig. 5 is a plan view of the assembled device as seen from the line II—II in Fig. 1 and looking in the direction of the arrows.

Fig. 6 is a sectional view through the switch and brush device, the view being taken along the line III—III in Fig. 2, and looking in the direction of the arrows.

Fig. 7 is a wiring diagram employed in the installation of the device, and illustrating the preferable position of the angle lights to the conventional head lights.

Similar numerals of reference designate the same parts throughout the several figures of the drawings.

In the drawings is shown an automobile steering wheel 10 and the steering shaft housing 11 which passes through the floor board 12 of the vehicle. The upper end of the housing 11 is supported by a bracket 13 that is rigidly attached to the instrument board 14 of the vehicle. In the housing 11 is the usual steering shaft 15 on which is mounted the steering wheel 10.

My invention comprises the worm 16 which is rigidly attached to the steering shaft 15, and which is in mesh with a worm gear segment 17 that is rigidly mounted on a switch arm operating shaft 18 on which is removably mounted a switch arm 19 in which is slidably socketed a brush element 20 that is urged outwardly against contact elements, which will later be described, by means of a helical spring 21 that is compressed between the inner end of the brush 20 and the end of a metallic electrical conductor element 22 that is L-shaped and one leg of the L is positioned behind the spring 21 while the other leg of the L rests on top of the switch arm 19 and is provided with a depression 23 that is positioned on the center axis of the shaft 18 and in which is seated a brush element 24 that is in electrical connection with the wire 25 which is the feed wire to the lighting system, the other side of the circuit being grounded. The brush 20 rests against contact points that will later be described.

In order to put the worm 16 on the shaft 15, it is necessary that a piece be cut out of the housing 11, so as to make room for the worm 16 as shown in Fig. 1. The worm 16 may be put on the shaft 15 by slipping the worm 16 over the end of, and up the shaft 15 to the desired position where the worm may be keyed to the shaft 15 and held in position by means of a pin 26 that is passed through the worm element 16 and the shaft 15. It will also be understood that the worm element 16 may be made in two pieces and placed around the shaft 15 and the pieces bolted together as a means of clamping the worm 16 on the shaft 15, thereby being able to put the worm 15 on the shaft 16 without tearing down the assembly of the steering mechanism.

At 27 and 28 is shown housing elements that are bolted together by bolts 29 in such a manner as to rigidly clamp the elements 27 and 28 on the adjacent ends of the steering shaft housing 11 and to also house the worm 16. The housing 28 is provided with a laterally extending housing 30 in which is housed the gear segment 17 that is rigidly mounted on the shaft 18.

At 31 is a complementary housing that is bolted to the housing 30 by means of bolts 32 to complete the housing 30 and to form a rigid clamp like mounting 33 for the housing element 34, in which is formed bearing portions 35 and 36 for the shaft 18.

On the upper end of the housing 34 is integrally formed an open top circular shaped cup like housing 37 in which is mounted a pair of electrical contact carrying elements 38 and 39 that are provided with upwardly extending flange like members 38a and 39a. The electrical contact carrying elements 38 and 39 are halved together as shown at A and are revolvably mounted around an annular flange like portion 18a formed on the upper end of the shaft 18. The adjacent flanged portions of the outer ends of the electrical contact carrying elements 38 and 39 are tongued and halved together as shown at B and are provided with metallic faces 40 and 41 and the metallic element 41 is turned over the top of the flange 39a to form a metallic top face 41a on the flange 38 and projecting therefrom and overlapping and contacting the edge of the metallic face 40 on the flange element 39a so that the elements 38 and 39 may be revolved toward or away from each other, and the tongue portion 40 will slide between the tongue portion 41 and the metallic top face 41a. Also on the flange 38a is a contact element 42 that is spaced a short distance away from the adjacent end of the contact element 41. The upper edge of the contact element 42 is turned over the upper edge of the flange element 38a to form a metallic face therefor.

At 43 is a contact element on the face of the flanged portion 39a, the upper edge of which is turned over the upper edge of the flanged portion 39a to form a metallic face therefor. One end of the contact element 43 is spaced a short distance away from the adjacent end of the contact end 40.

The faces of these contact points 40, 41—41a, 42 and 43 lie in a circular shape about the center axis of the shaft 18, and the contact carrying elements 38 and 39 and the parts carried thereon are movable toward and away from each other within the housing 37.

At 44 is an operating element for the contact carrying elements 38 and 39. The operating element is a Y-shaped element, one leg 45 of which slidably passes through the wall of the housing 37, the other two legs 46 and 47 of which straddle the upper end of the shaft 18 and lie on the floor of the cup shaped housing 37 and under the contact carrying elements 38 and 39 and are provided with upwardly projecting pin elements 48 and 49 which are positioned in elongated holes 50 and 51 in the contact carrying elements 38 and 39.

The outer end 45a of the leg 45 is turned at any desired angle to the leg 45 and is provided with a hole through which is passed the threaded end 51 of a stud formed on the end of a shaft 52. There being a nut 53 threaded on the stud 51 so as to rigidly bind and hold the turned portion 45a between the nut 53 and the end of the shaft 52.

The shaft 52 extends from the turned portion 45a to and through the instrument board 14 of the vehicle and terminates in a knob 54 by which the shaft 52 may be pulled or pushed for adjustment purposes of the electrical contact carrying elements as will later be described.

At 55 is shown a cap element that is made of electrical insulating material and is fitted on the top of the cup shaped housing 37 and is held in proper position thereon by means of two spring clip elements 56 and 57 that are rigidly attached to the outside of the cup shaped housing 37 and catching on pin elements 58 and 59 that are rigidly fixed in the cap 55. In the cap 55 is rigidly fixed four brush holders 60, 61, 62 and 63 that are electrically connected with one end of the wires 25, 64, 65 and 66 respectively.

Each of these brush holders are constructed the same and comprise a metallic body portion 62 that is provided with a flange portion X that is embedded in the cap 55, the lower portion of the body 62 is provided with a bore in which is positioned a brush Y, there being a helical spring Z compressed between the upper end of the brush X and the bore in which the brush X is slidably mounted. The upper portion of the body 62 is provided with a small bore T in which the wire, such as 65 is positioned and at U is a set screw, threaded in the body 62 and engaging the wire 65 as a means of binding the wire 65 in the bore T and making a definite electrical contact between the wire 65 and the body 62. At V is a housing made of electrical insulating material and is threaded on the body element 62 so as to bear against an insulating washer W that is positioned between the housing V and the cap 55.

It will be understood that the helical spring Z will press the brush X downward to contact its respective contact elements 42, 41a or 43 or 22, as the case may be.

The other end of the wire 25 is connected to one side of the light control switch 67. At 68 is a wire, one end of which connects to the other side of the switch 67 and the other end connects to one post of the battery 69, and at 70 is another wire, one end of which connects to the other post of the battery 69, and the other end of the wire 70 is connected with the ground.

The other end of the wire 65 connects with one side of a resistance 71 for dimming the head light in the usual manner. At 72 is another wire, one end of which connects with the other end of the resistance 71 and the other end of the wire 72 connects with the wire 72a, the ends of which connect with the head lights 73 and 74.

The other end of the wire 64 connects with the angle light 75, and the other end of the wire 66 connects with the angle light 76. At 77 is a wire that connects with the head light 73 and the angle light 75 and also connects with the ground. At 78 is another wire that connects between the head light 74 and the angle light 76 and also connects with the ground.

The head lights 73 and 74 are conventional head lights found on most all motor driven vehicles. The angle lights 75 and 76 are preferably built into the head lights 73 and 74 in such a manner that the left head light 73 will cast a beam of light straight ahead, but when the angle light is lighted it will cast a beam of light to the right as indicated in Fig. 7; and the right headlight 74 will cast a beam of light straight ahead, but when the angle light 76 is lighted it will cast a beam of light to the left as indicated in Fig. 7.

The operation of the device is as follows: To use the lights, the switch 67 is closed, whereupon the head lights 73 and 74 are lighted and cast a beam of light straight ahead as indicated by the arrows C—C, and by operaitng the variable resistance device 71 the head lights 73 and 74 may be dimmed or brightened in the usual manner.

Now if the steering wheel 19 and shaft 15 be turned so as to steer the vehicle to the right, the worm 16 will drive the gear segment 17 and revolve the shaft 18 and switch arm 19 so that the switch arm 19 will slip the brush 20 from contact with the contact elements 40—41—41a to the contact element 43, whereupon the circuit of the headlights 73 and 74 would be broken and the headlights 73 and 74 would therefore be extinguished and the circuit for the angle light 75 would be completed and the angle light 75 would therefore be lighted and would cast a beam of light in the direction of the arrow D which is to the right side of the vehicle. As the vehicle makes the turn and the steering wheel 10 and steering shaft 15 is turned so as to steer the vehicle to run in a straight line, the elements 16—17 and 18 will swing the switch arm 19 to its original position whereupon the brush 20 will again contact the contact points 40—41—41a and the circuit for the angle light 75 will be broken and the angle light 75 will therefore be extinguished, and the circuit for the head lights 73 and 74 will again be completed and the headlights 73 and 74 will then be lighted and cast a beam of light in the direction of the arrows C which is straight ahead of the vehicle.

Now if the steering wheel 10 and shaft 15 be turned so as to steer the vehicle to the left, the parts 16—17—18 would operate to swing the switch arm 19 to a position where the brush 20 will contact the contact element 42, whereupon the circuit for the head light 73 and 74 would be broken and the lights 73 and 74 extinguished, and the circuit for the angle light 76 would be completed and the angle light 76 would therefore be lighted and would cast a beam of light in the direction of the arrow E which is to the left side of the vehicle. Now if the steering wheel 10 and shaft 15 be turned so as to again steer the vehicle to run in a straight line, the elements 16—17—18 would again swing the switch arm 19 to a position such that the brush 20 will contact the contact elements 40—41—41a whereupon the circuit for the angle light 76 would be broken and the angle light 76 would therefore be extinguished, and the circuit for the head lights 73 and 74 would again be completed and the headlights 73 and 74 would again cast a beam of light in the direction of the arrows C which is straight ahead of the vehicle.

Now it is desirable to adjust the switch device with respect as to when the headlights will be extinguished and the angle light lighted relative to the sharpness of the turn being made by the vehicle. This adjustment is made as follows: We will assume that the front wheels of the vehicle will be turned for ordinary traffic down the street in which the vehicle passes other vehicles and must swing around them, in which operation it is desired that the angle lights 75 and 76 do not operate.

To accomplish this, the knob 54, rod 52 and Y-shaped element 45 are pulled rearwardly, and whereby the contact carrying elements 38 and 39 are revolved away from each other, thereby increasing the distance between the contact points 42 and 43 so that the switch arm 19 may be allowed to have considerable swing without contacting the contact points 42 and 43, which movement will be set up by the turning the shaft 15 in guiding the vehicle around other vehicles and the head lights 73 and 74 will continue to burn and the angle lights 75 and 76 will not have been brought into service.

Now if the vehicle is to turn a corner and the turn to be made is rather sharp, and the angle lights are to be used early in the turn, the knob 54, shaft 52 and Y-shaped element 45 are pushed forward, whereby the contact carrying elements 38 and 39 are revolved towards each other, thereby materially shortening the distance between the contact points 42 and 43 so that as the shaft 15 is revolved, to guide the front wheels of the vehicle to make the turn, the switch arm 19 and brush 20 therein will be swung the same as above described, but the brush 20 will contact the contact points 42 or 43 as the case may be, earlier in the turn of guiding the front wheels of the vehicle.

Also as shown in Fig. 7, the variable resistance 71 affects only the headlights 73 and 74, therefore the head lights may be dimmed, but as the turn is being made and the lights 75 or 76 is brought into use, these lights will be bright lights so as to fully light the area onto which the vehicle is turning, and as the vehicle is making the turn and is guided to run in a substantially straight line, the head lights 73 and 74 will again be lighted and their brightness will be influenced by the variable resistance 71 the same as before.

Such modifications may be employed as lie within the scope of the appended claims. Now having fully described my invention, I claim:

1. In an electric switch device for the control of three electric circuits; said switch device having a switch arm carried on a shaft and being swingable in opposite directions thereby, three contact elements, said contact elements being arranged in a segment of a circle, the second of said contact elements being stationarily positioned, the first and third contact elements being carried, each on a swingable element that is revolvable about an axis that is the center axis of said shaft so that the first and third contact elements may be moved in an arc toward or away from the second contact element, and operating means connected to the first and third contact carrying elements for the simultaneous movement of said elements to equally space the first and third contact elements at varied distances from the second contact element, said operating means being movable from remote distances, said switch arm being adapted to engage the said contact elements separately during the swinging movement of the arm, and electrical contact means for each electrical contact element and said switch arm for the delivery of electric current as described.

2. In an electric switch device for the control of three electric circuits; said device being as defined in claim 1, said shaft having a gear segment rigidly mounted thereon and being in mesh with a worm on the steering shaft of a vehicle as and for the purpose described.

JOSEPH EARL SCOTT.